US009845851B2

(12) United States Patent
Orita

(10) Patent No.: US 9,845,851 B2
(45) Date of Patent: Dec. 19, 2017

(54) SPRING MECHANISM AND LINEAR MOTION DISPLACEMENT MECHANISM

(71) Applicant: HONDA MOTOR CO., LTD., Tokyo (JP)

(72) Inventor: Atsuo Orita, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 428 days.

(21) Appl. No.: 14/724,272

(22) Filed: May 28, 2015

(65) Prior Publication Data
US 2016/0348774 A1 Dec. 1, 2016

(51) Int. Cl.
F16H 25/20 (2006.01)
F16F 1/32 (2006.01)
F16F 3/02 (2006.01)

(52) U.S. Cl.
CPC ............. *F16H 25/20* (2013.01); *F16F 1/32* (2013.01); *F16F 3/02* (2013.01)

(58) Field of Classification Search
CPC F16H 25/20; F16F 3/02; H02N 2/163; H02N 2/026; H03H 9/09; H03H 9/0504; H03H 9/1028
USPC ..................... 310/323.09, 328, 355
See application file for complete search history.

(56) References Cited

U.S. PATENT DOCUMENTS

| 5,689,994 A * | 11/1997 | Nagai ...................... B23Q 1/25 310/80 |
| 2002/0084719 A1* | 7/2002 | Okamoto ............... H02N 2/025 310/328 |
| 2004/0195070 A1* | 10/2004 | Kao ...................... F16D 13/583 192/109 F |
| 2010/0300222 A1* | 12/2010 | Hino ...................... H02N 2/163 74/25 |
| 2011/0148015 A1* | 6/2011 | Hodgson ................... F16F 7/12 267/136 |
| 2015/0323050 A1* | 11/2015 | Ohno ...................... F16H 25/20 74/434 |

FOREIGN PATENT DOCUMENTS

JP  2009-041463  2/2009

* cited by examiner

*Primary Examiner* — Bryan Gordon
(74) *Attorney, Agent, or Firm* — Rankin, Hill & Clark LLP

(57) ABSTRACT

The present invention provides a spring mechanism which can elastically deform an elastic deformation part with a film shape of a transducer into a shape having high symmetry, and also can be structured in a small size. A spring mechanism 2 includes: a cylindrical member 7 that is provided so as to extend toward a first element member 21 from an elastic deformation part 11 of a transducer 5, and also is arranged so as to slidably penetrate the first element member 21 in the direction of a central axis line C of the elastic deformation part 11; and a rod member 32 that is provided so as to extend toward the cylindrical member 7 from a second element member 22 side, and is slidably inserted in the cylindrical member 7 in the direction of the central axis line C of the elastic deformation part 11.

6 Claims, 5 Drawing Sheets

SPRING MECHANISM AND LINEAR MOTION DISPLACEMENT MECHANISM

BACKGROUND OF THE INVENTION

Field of the Invention

The present invention relates to a spring mechanism that includes a transducer that has an elastic deformation part with a film shape, which elastically extends and contracts in a direction along a face, depending on input energy, and to a linear motion displacement mechanism which has the spring mechanism.

Description of the Related Art

Conventionally, a mechanism is known that is described, for instance, in FIG. 6 to FIG. 8 of Japanese Patent Laid-Open No. 2009-41463, as a mechanism corresponding to the spring mechanism which includes the transducer that has the elastic deformation part with the film shape, which elastically extends and contracts in the direction along the face, depending on.

The spring mechanism described in the above described Japanese Patent Laid-Open No. 2009-41463 includes: an electrostrictive element as the transducer, which has the elastic deformation part that includes an elastic film made from a dielectric elastomer and electrodes for applying voltage in the thickness direction; and also a housing which accommodates the electrostrictive element therein. The edge part of the elastic deformation part of the electrostrictive element is supported by a side wall of the housing.

Furthermore, in the mechanism described in FIG. 6 and FIG. 7 of Japanese Patent Laid-Open No. 2009-41463, a rod which is provided so as to extend to one side out of both sides in a thickness direction of the elastic deformation part, from the central part of the elastic deformation part of the electrostrictive element, penetrates the through hole formed in the housing.

In addition, in a mechanism described in FIG. 8 of Japanese Patent Laid-Open No. 2009-41463, a rod which is provided so as to extend to both sides in the thickness direction of the elastic deformation part, from the central part of the elastic deformation part of the electrostrictive element, penetrates the through hole formed in the housing.

Any of the mechanisms is structured so that the central part of the elastic deformation part is displaced in the central axis direction (shaft center direction of rod) of the elastic deformation part, by the extension and contraction in a direction along the face of the elastic deformation part, and so that the rod moves (linearly moves) in synchronization with the displacement.

Accordingly, any of the mechanisms is structured so as to be capable of transmitting an elastic force which has been generated by the extension and contraction of the elastic deformation part of the electrostrictive element, to the outside through the rod. In addition, the mechanism can also change the rigidity of the elastic deformation part by changing voltage to be applied to the elastic deformation part (consequently by changing input energy).

In the transducer provided in the spring mechanism as described in the above described Japanese Patent Laid-Open No. 2009-41463, the central part of the elastic deformation part can be displaced with a comparatively large stroke, by elastic deformation corresponding to the extension and contraction in the direction along the face of the elastic deformation part. Consequently, a stress tends to easily concentrate on the vicinity of the central part of the elastic deformation part of the transducer, during the elastic deformation.

Because of this, particularly if the elastic deformation of the elastic deformation part of the transducer becomes an imbalanced deformation (elastic deformation having low symmetry of elastic deformation shape), during the elastic deformation in which the displacement in the central part of the elastic deformation part becomes comparatively large, a damage such as a crack of the elastic deformation part due to local stress concentration tends to easily occur.

Here, in the spring mechanism having the structure described in FIG. 6 and FIG. 7 of the above described Japanese Patent Laid-Open No. 2009-41463, the rod which is provided so as to extend from the central part of the elastic deformation part of the electrostrictive element (transducer) penetrates the through hole of the housing on one side in the thickness direction (central axis direction) of the elastic deformation part. Because of this, if a length of the through hole is sufficiently increased, it is possible to displace the central part of the elastic deformation part so that the elastic deformation of the elastic deformation part does not become the imbalanced deformation as much as possible (so that symmetry of elastic deformation shape is kept).

However, in this case, it is necessary to sufficiently increase the length of the above described through hole, and accordingly it is necessary to increase the thickness of the housing which has the through hole formed therein. Consequently, the size of the spring mechanism results in being enlarged.

In addition, in the spring mechanism having the structure described in FIG. 8 of the above described Japanese Patent Laid-Open No. 2009-41463, the rod which is provided so as to extend from the central part of the elastic deformation part of the electrostrictive element (transducer) penetrates the through hole of the housing, on both sides in the thickness direction (central axis direction) of the elastic deformation part. In this case, the through holes exist in both of the sides in the thickness direction of the elastic deformation part, and accordingly it is possible to displace the central part of the elastic deformation part so that the elastic deformation of the elastic deformation part does not become the imbalanced deformation as much as possible (so that symmetry of elastic deformation shape is kept), even when the length of the through hole is comparatively short.

However, in this case, the rod results in appearing from and disappearing into the housing on both sides (both sides in the thickness direction of the elastic deformation part) of the housing, and accordingly a space necessary for the arrangement of the spring mechanism results in being large.

SUMMARY OF THE INVENTION

The present invention is designed with respect to such a background, and an object is to provide a spring mechanism that can elastically deform an elastic deformation part with a film shape of a transducer such as an electrostrictive element, into a shape having high symmetry, and also can be structured in a small size.

Furthermore, another object is to provide a linear motion displacement mechanism which can be structured in a small size by using the spring mechanism.

In order to achieve the above described object, a spring mechanism of the present invention includes: a transducer that has an elastic deformation part with a film shape, which is structured so as to be able to elastically extend and contract in a direction along a face, depending on input energy; a supporting member which supports an edge part of the elastic deformation part of the transducer, wherein the spring mechanism further comprises:

a first element member and a second element member which are arranged on both sides in a direction of a central axis line of the elastic deformation part of the transducer, so as to face to the elastic deformation part at a distance from the elastic deformation part, respectively, and are also fixed to the supporting member, respectively;

a cylindrical member that is provided so as to extend toward the first element member from the elastic deformation part of the transducer in the same direction as the central axis line of the elastic deformation part of the transducer, also is arranged so as to slidably penetrate the first element member, and is formed into a hollow cylindrical shape in which one end on the elastic deformation part side of the transducer is opened; and a rod member which is provided so as to extend toward the cylindrical member from the second element member side coaxially with the cylindrical member, and is slidably inserted in the cylindrical member, and one set of the cylindrical member and the rod member is arranged on the central axis line of the elastic deformation part of the transducer, or a plurality of sets of the cylindrical member and the rod member are arranged so as to align at an equiangular distance along a circumference of a circle around the central axis line of the elastic deformation part of the transducer, which has a fixed radius from the central axis line (first invention).

Incidentally, in the present invention, the above described first element member and second element member may be structured integrally with the above described supporting member. Accordingly, the above described first element member and second element member may be a part of the above described supporting member.

According to such the present invention, the one set of the above described cylindrical member and the above described rod member is arranged on the central axis line of the elastic deformation part of the above described transducer, or a plurality of sets of the above described cylindrical member and the above described rod member are arranged so as to align at an equiangular distance along a circumference of a circle around the central axis line of the elastic deformation part of the above described transducer, which has a fixed radius from the central axis line.

In this case, the above described cylindrical member that is provided so as to extend toward the above described first element member from the elastic deformation part of the above described transducer in the same direction as the central axis line of the elastic deformation part of the above described transducer slidably penetrates the first element member. In addition, a rod member which is provided so as to extend from the above described second element member side coaxially with the cylindrical member is inserted in this cylindrical member.

Because of this, the moving direction of the cylindrical member is determined with high stability in the same direction as the central axis line of the above described elastic deformation part. Accordingly, it becomes possible to elastically deform the elastic deformation part with the film shape, into a shape having high symmetry (such shape as to become axially symmetric with respect to the central axis line).

In addition, the cylindrical member projects to an opposite side to the transducer, out of both sides of the above described first element member in the above described direction of the central axis line, and also the amount of the projection results in varying according to the elastic deformation of the elastic deformation part of the transducer, but the above described cylindrical member does not project to an opposite side to the transducer, out of both sides of the above described second element member in the above described direction of the central axis line.

Accordingly, the spring mechanism according to the first invention can elastically deform the elastic deformation part with the film shape of the transducer into a shape having high symmetry, and also can be structured into a small size.

In the above described first invention, the one set of the cylindrical member and the rod member is preferably arranged on the central axis line of the elastic deformation part of the transducer (second invention).

Thereby, the spring mechanism can reduce the number of its components, and can reduce its size in a direction perpendicular to the central axis line of the above described elastic deformation part.

In addition, the above described first invention or second invention is preferable in the case where the transducer is a transducer that has a plurality of elastic deformation parts which are stacked in a thickness direction (third invention).

Thereby, the spring mechanism reduces the variation of the elastic deformation shapes of the plurality of the above described elastic deformation parts, and can elastically deform the plurality of the above described elastic deformation parts into the shape having high symmetry.

In addition, a linear motion displacement mechanism of the present invention is a linear motion displacement mechanism which carries out relative displacement between a first member and a second member, including:

the spring mechanism of the present invention; and an actuator that has a linearly moving shaft which is provided integrally with the rod member and movably in the same direction as a central axis line of the elastic deformation part, and generates a driving force of displacing the linearly moving shaft in a shaft center direction thereof, wherein the first member is connected to a portion of the cylindrical member of the spring mechanism, which extends from the first element member to an opposite side of the transducer, and the rod member is connected to the second member via the linearly moving shaft (fourth invention).

Incidentally, in the linear motion displacement mechanism of the present invention, the above described rod member may be either a rod member which is fixed to the above described linearly moving shaft, or a rod member which is formed integrally with the linearly moving shaft.

According to such the linear motion displacement mechanism of the present invention, the above described linearly moving shaft is displaced in the shaft center direction by the above described actuator, and thereby a distance between a connecting portion of the above described first member with the above described cylindrical member and a connecting portion of the above described second member with the above described linearly moving shaft varies. Thereby, relative displacement between the first member and the second member is carried out.

In this case, in an arbitrary state of relative displacement between the first member and the second member, when an external force acts on either the first member or the second member, which works so as to vary the distance between the connecting portion of the first member with the cylindrical member and the connecting portion of the second member with the linearly moving shaft, the elastic deformation part of the transducer of the above described spring mechanism is elastically deformed. Thereby, an elastic force which resists the above described external force is generated between the first member and the second member.

In this case, the spring mechanism can elastically deform the elastic deformation part of the transducer into a shape having high symmetry, and accordingly can stably generate the above described elastic force. In addition, the spring mechanism can smoothly vary the above described elastic force, by varying the magnitude of the energy to be input into the above described transducer. In addition, the spring mechanism can be structured into a small size, and accordingly the linear motion displacement mechanism also can be structured into a small size.

In the above described fourth invention, the actuator can be adopted as the above described actuator, which includes: a ball screw mechanism that has a screw shaft working as the linearly moving shaft, and a nut which fits around the screw shaft via balls; and a motor which rotationally drives the nut of the ball screw mechanism (fifth invention).

Thereby, the above described actuator can be structured into a small size.

In addition, in the above described fourth invention or fifth invention, it is preferable that the rod member and the linearly moving shaft are coaxially and integrally configured (sixth invention).

Thereby, the above described linearly moving shaft can be inserted in the cylindrical member of the above described spring mechanism, when being moved in the shaft center direction. Because of this, the linear motion displacement mechanism can be structured into a small size, while making the displacement of the linearly moving shaft comparatively large.

DETAILED DESCRIPTION OF THE PREFERRED EMBODIMENTS

Figure 1:
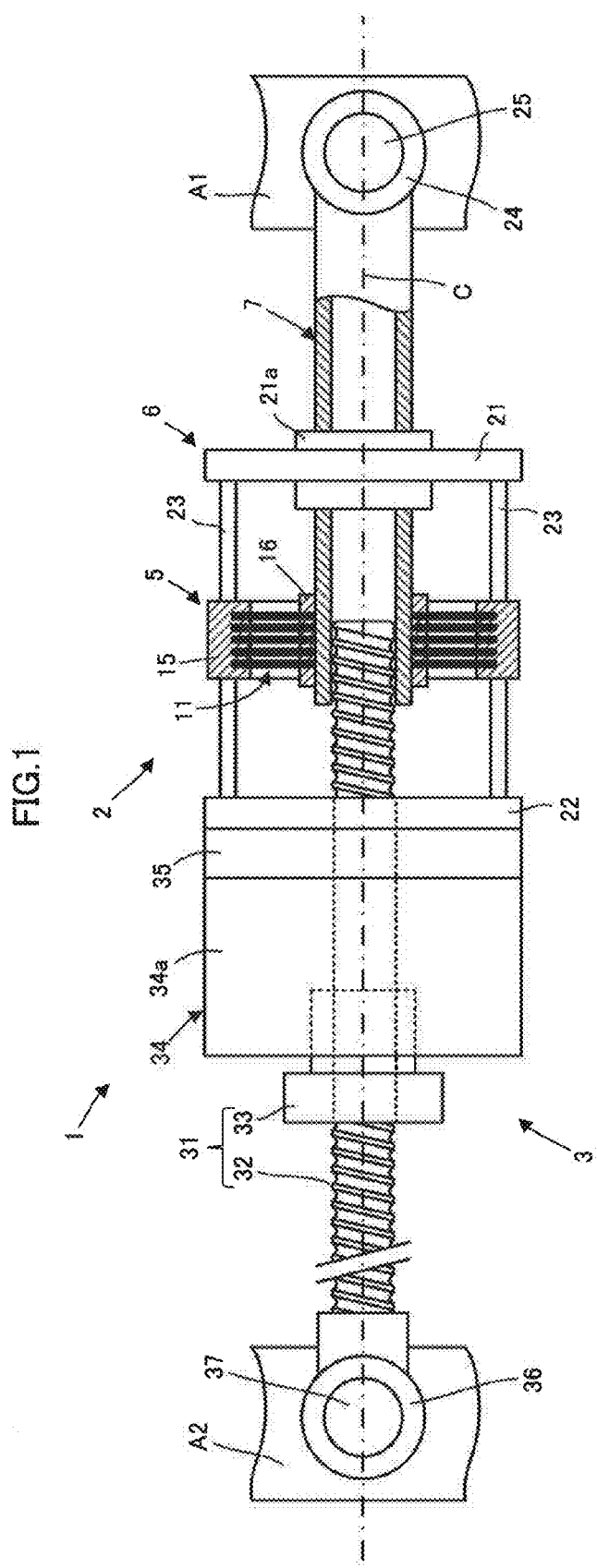
FIG. 1 is a view showing a structure of a linear motion displacement mechanism of one embodiment of the present invention.

One embodiment of the present invention will be described below with reference to FIG. 1 to FIG. 4. With reference to FIG. 1, a linear motion displacement mechanism 1 of the present embodiment is a mechanism which carries out relative displacement between a first member A1 and a second member A2. More specifically, the linear motion displacement mechanism 1 carries out the relative displacement between the first member A1 and the second member A2 so that a connecting portion of the first member A1 and a connecting portion of the second member A2 move close to or move away from each other along a line which connects the connecting portions. The first member A1 and the second member A2 may also be an arbitrary member.

As one example, for instance, two links of a robot can be adopted as the first member A1 and the second member A2. In this case, the linear motion displacement mechanism 1 can be used as a mechanism which drives a rotary type joint that connects the first member A1 and the second member A2 to each other, or a linearly moving joint mechanism which connects the first member A1 and the second member A2 to each other. However, it is needless to say that an object to which the linear motion displacement mechanism 1 is applied is not limited to the robot.

The above described linear motion displacement mechanism 1 is provided with a spring mechanism 2, and an actuator 3 having a linearly moving shaft. The spring mechanism 2 is one example of the spring mechanism of the present invention. This spring mechanism 2 has a transducer 5, a base frame 6, and a cylindrical member 7.

In the present embodiment, the transducer 5 is an electrostrictive element that has a plurality of elastic deformation parts 11 with a film shape, which can elastically extend and contract in a direction along a face depending on applied voltage, and that has a structure in which the plurality of the elastic deformation parts 11 are stacked in a thickness direction. The transducer 5 will be hereinafter referred to as the electrostrictive element 5.

Figure 4:
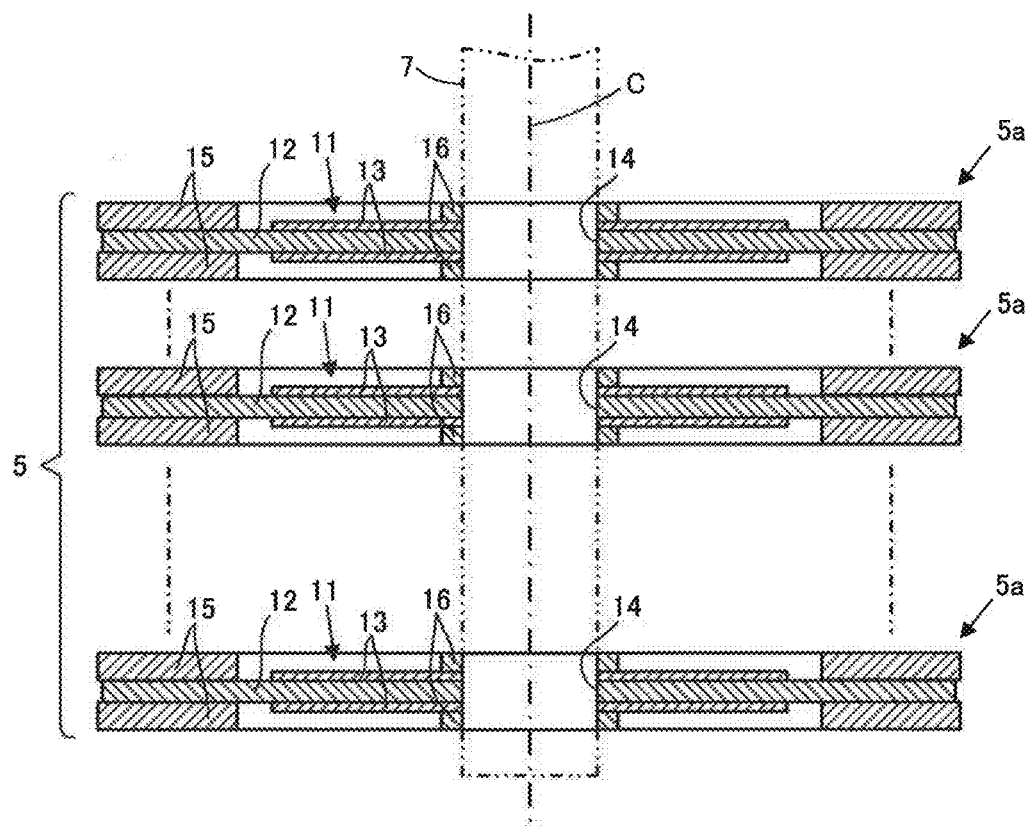
FIG. 4 is a view showing a structure of a transducer (electrostrictive element) which is provided in the linear motion displacement mechanism of the embodiment.

Specifically, the electrostrictive element 5 is structured, for instance, as is shown in FIG. 4. Each of the elastic deformation parts 11 which constitute the electrostrictive element 5 includes: a dielectric elastomer 12 with a film shape; and electrodes 13 with a film shape, which have been attached to both faces in a thickness direction of the dielectric elastomer 12.

The dielectric elastomer 12 is an elastomer having dielectricity, and is formed from, for instance, a silicon resin, an acrylic resin or the like. When voltage is applied to the dielectric elastomer 12 through the electrodes 13 and 13 on both faces in the thickness direction thereof (when electric field is made to act in the thickness direction), this dielectric elastomer 12 is compressed in the thickness direction by the Maxwell stress. Then, the dielectric elastomer 12 elastically extends in a direction along the face, concurrently with the compression.

In addition, when the magnitude of a voltage to be applied to the dielectric elastomer 12 is varied, the thickness of the dielectric elastomer 12 varies. Consequently, the dielectric elastomer 12 elastically extends and contracts in the direction along the face.

Thereby, each of the elastic deformation parts 11 is structured so as to be able to elastically extend and contracting in the direction along the face, depending on the applied voltage. Incidentally, it is needless to say that each of the elastic deformation parts 11 is elastically deformed depending on an external force.

In the present embodiment, a through hole 14 which penetrates the elastic deformation part 11 in the thickness direction is bored in the central part of each of the elastic deformation parts 11. In addition, supporting frames 15 and 16 are fitted to an edge part in the outer peripheral side of each of the elastic deformation parts 11, and an edge part in the inner peripheral side thereof, respectively.

In this case, a portion of the elastic deformation part 11 between the supporting frame 15 on the outer peripheral side and the supporting frame 16 on the inner peripheral side is formed into an annular shape.

In addition, the supporting frames 15 and 16 are fitted to the elastic deformation part 11 in a state of pulling the dielectric elastomer 12 of the elastic deformation part 11 in a direction along the face. Accordingly, the dielectric elastomer 12 is in a pre-strained state in which a tensile force in the direction along the face has been previously given thereto.

Because of this, the elastic deformation part 11 is structured, when a voltage has been applied to the dielectric elastomer 12, so as to be bent in the state in which the edge part on the inner peripheral side of the elastic deformation part 11 is relatively displaced with respect to the edge part on the outer peripheral side thereof, in the approximately same direction as the central axis line C of the elastic deformation part 11 (the thickness direction of the elastic deformation part 11).

Because the elastic deformation part 11 is elastically deformed (bent) in the above way, the supporting frame 16 on the inner peripheral side is enabled to be relatively displaced with respect to the supporting frame 15 on the outer peripheral side, in the approximately same direction as the central axis line C of the elastic deformation part 11.

A structure which is configured of each elastic deformation part 11 and the supporting frames 15 and 16 that are fitted to the elastic deformation part 11 will be hereinafter referred to as an electrostrictive constituent element 5a.

The electrostrictive element 5 of the present embodiment is structured in such a way that a plurality of electrostrictive constituent elements 5a which are each structured in the above described way are stacked in the thickness direction of the elastic deformation part 11 so that the central axis line C of each of the elastic deformation parts 11 coincides with the same central axis line C.

In this case, the supporting frames 15 on the outer peripheral side of the plurality of the electrostrictive constituent elements 5a are stuck to each other by an adhesive or the like, and also the supporting frames 16 on the inner peripheral side thereof are stuck to each other by an adhesive or the like. Thereby, the electrostrictive element 5 is structured.

The electrostrictive element 5 shown in FIG. 1 is a simply drawn figure of the electrostrictive element 5 which is structured in the above way. In this case, in FIG. 1, a stacked body of the supporting frames 15 on the outer peripheral side of the plurality of electrostrictive constituent elements 5a and a stacked body of the supporting frames 16 on the inner peripheral side thereof are each drawn as an integrated structure, for the convenience of the illustration. In the subsequent description, the stacked body of the supporting frames 15 on the outer peripheral side will be simply referred to as a supporting frame 15 of the electrostrictive element 5, and the stacked body of the supporting frames 16 on the inner peripheral side will be simply referred to as a supporting frame 16 of the electrostrictive element 5.

In addition, in the electrostrictive element 5, the common central axis line C of each of the elastic deformation parts 11 is simply referred to as a central axis line C of the electrostrictive element 5.

Incidentally, a voltage is applied to the elastic deformation part 11 of each of the electrostrictive constituent elements 5a of the electrostrictive element 5, for instance, through an unillustrated wire which is connected to the supporting frame 15, or the like.

The description shall return to FIG. 1. In the present embodiment, the base frame 6 of the spring mechanism 2 includes: a first plate 21 and a second plate 22 which are arranged at a distance from the electrostrictive element 5, on both sides of the electrostrictive element 5 in the direction of the central axis line C; and a plurality of connecting rods 23 which connect the first plate 21 and the second plate 22.

Spaces between the electrostrictive element 5 and each of the first plate 21 and the second plate 22 are set so that the elastic deformation part 11 of the electrostrictive element 5 can be elastically deformed (bent) within the spaces, respectively.

Each of the connecting rods 23 is arranged in the periphery of the elastic deformation part 11 of the electrostrictive element 5 so as to extend in the same direction as the central axis line C of the electrostrictive element 5. In addition, both ends of each of the connecting rods 23 are fixed to the first plate 21 and the second plate 22, respectively.

In addition, each of the connecting rods 23 is inserted into the supporting frame 15 on the outer peripheral side of the electrostrictive element 5, and is fixed to the supporting frame 15. Thereby, the edge part on the outer peripheral side of the elastic deformation part 11 of the electrostrictive element 5 is supported by the connecting rod 23 of the base frame 6 through the supporting frame 15.

The description will be complemented. The connecting rod 23 of the base frame 6 corresponds to the supporting member in the present invention, and the first plate 21 and the second plate 22 correspond to a first element member and a second element member in the present invention, respectively.

The cylindrical member 7 of the spring mechanism 2 slidably penetrates a hole (of which illustration is omitted) which is formed in a guide part 21a that is fixed to the central part of the first plate 21, and is arranged coaxially with the central axis line C of the electrostrictive element 5.

The cylindrical member 7 is a hollow cylindrical member of which one end (left side end in FIG. 1) is opened toward the second plate 22. Furthermore, the opened end of the cylindrical member 7 is inserted into the through hole 14 in the central part of the electrostrictive element 5 which is positioned between the first plate 21 and the second plate 22 of the base frame 6, and the outer circumference of the open end of the cylindrical member 7 is stuck to the supporting frame 16 on the inner peripheral side of the electrostrictive element 5.

Thereby, the cylindrical member 7 is arranged so as to extend toward the first plate 21 side from the supporting frame 16 which is positioned in the central part of the elastic deformation part 11 of the electrostrictive element 5, in the same direction as the central axis line C of the electrostrictive element 5, and slidably penetrates the first plate 21.

In addition, an end (right side end in FIG. 1) of the cylindrical member 7 on an opposite side to the electrostrictive element 5 is connected to the first member A1. In the present embodiment, an annular connecting member 24 which is fixed to an end of the cylindrical member 7 on an opposite side to the electrostrictive element 5 is connected to the first member A1 through a supporting shaft 25. Thereby, the cylindrical member 7 is pivotally supported by the first member A1 so as to be capable of relatively rotating with respect to the first member A1, around the shaft center (around the shaft center in the direction perpendicular to the face of the paper in FIG. 1) of the supporting shaft 25.

Next, the above described actuator 3 includes, for instance: a ball screw mechanism 31 which has a screw shaft 32 that functions as a linearly moving shaft, and a nut 33 that is fitted around the screw shaft 32 through balls (of which illustration is omitted); and a motor 34 that functions as a power source.

In the present embodiment, the motor 34 is, for instance, an electric motor. A rotation detector 35 which outputs a detection signal corresponding to a rotation angle or a rotation speed of a rotor (of which illustration is omitted) of the motor 34 is fitted to one end (right side end in FIG. 1) of a housing 34a of this motor 34. The rotation detector 35 is configured of, for instance, a rotary encoder or the like. The detection signal of this rotation detector 35 is used for the control of the operation of the motor 34.

In addition, the housing 34a of the motor 34 is fixed to the second plate 22 of the above described base frame 6 through the rotation detector 35.

The description will be complemented. A motor other than the electric motor, for instance, a hydraulic motor can also be adopted as the motor 34.

A screw shaft 32 (linearly moving shaft) of the ball screw mechanism 31 is arranged so as to penetrate the housing 34a of the motor 34, the rotation detector 35 and the second plate 22 of the base frame 6. In this case, the screw shaft 32 is arranged coaxially with the central axis line C of the electrostrictive element 5.

In addition, a portion of the screw shaft 32 (right side portion in FIG. 1), which projects from the second plate 22, is slidably inserted in the above described cylindrical member 7.

Incidentally, in the present embodiment, the screw shaft 32 has a screw formed also in the portion which is inserted in the cylindrical member 7, but it is also acceptable that the screw is not formed in the portion which is inserted in the cylindrical member 7.

The description will be complemented. The screw shaft 32 has both a function as the linearly moving shaft and a function as the rod member in the present invention. Because of this, in the present embodiment, the linearly moving shaft and the rod member result in being integrally configured.

In addition, an end of the screw shaft 32 (left side end in FIG. 1), on an opposite side to the base frame 6, is connected to the second member A2. In the present embodiment, an annular connecting member 36 which is fixed to an end of the screw shaft 32 on an opposite side to the base frame 6 is connected to the second member A2 through a supporting shaft 37. Thereby, the screw shaft 32 is pivotally supported by the second member A2 so as to be capable of relatively rotating with respect to the second member A2 around the shaft center (around the shaft center in the direction perpendicular to the face of the paper in FIG. 1) of the supporting shaft 37.

The nut 33 of the ball screw mechanism 31 is connected to the rotor of the motor 34 in the inside of the housing 34a of the motor 34 so that a rotational driving force is given thereto from the motor 34.

The linear motion displacement mechanism 1 of the present embodiment is structured as has been described above. The linear motion displacement mechanism 1 having such a structure is structured so that the nut 33 is rotationally driven by the motor 34 of the actuator 3 and thereby the screw shaft 32 moves in the shaft center direction (the same direction as the central axis line C) of the screw shaft 32 while sliding with respect to the cylindrical member 7.

Thereby, relative displacement between a connecting portion of the first member A1 with the cylindrical member 7 and a connecting portion of the second member A2 with the screw shaft 32 (moving close to or moving away from each other) shall be carried out.

Figure 2:
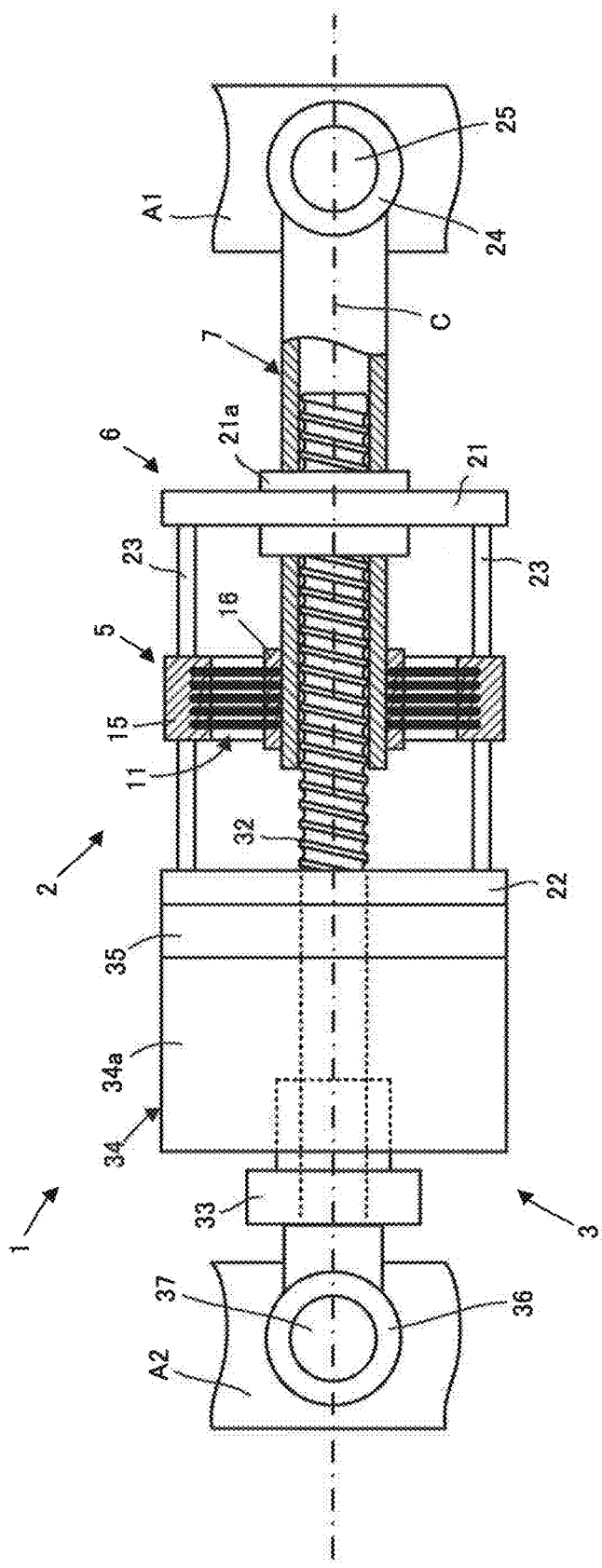
FIG. 2 is a view showing a state at the time when the linear motion displacement mechanism of the embodiment is shortened.

For instance, when the nut 33 is rotationally driven so that the screw shaft 32 moves rightward in FIG. 1 from the state illustrated in FIG. 1, the relative displacement between the first member A1 and the second member A2 can be carried out so that a distance (distance in the direction of the central axis line C) between the connecting portion of the first member A1 with the cylindrical member 7 and the connecting portion of the second member A2 with the screw shaft 32 is decreased, as is illustrated in FIG. 2.

In addition, when an external force (translational force) in the direction of the central axis line C of the electrostrictive element 5 acts on the first member A1 or the second member A2, in a state of an arbitrary distance between the connecting portion of the first member A1 with the cylindrical member 7 and the connecting portion of the second member A2 with the screw shaft 32, the elastic deformation part 11 is elastically bent so that the supporting frame 16 on the inner peripheral side of the electrostrictive element 5 is displaced in the direction of the central axis line C with respect to the supporting frame 15 on the outer peripheral side thereof.

Figure 3:
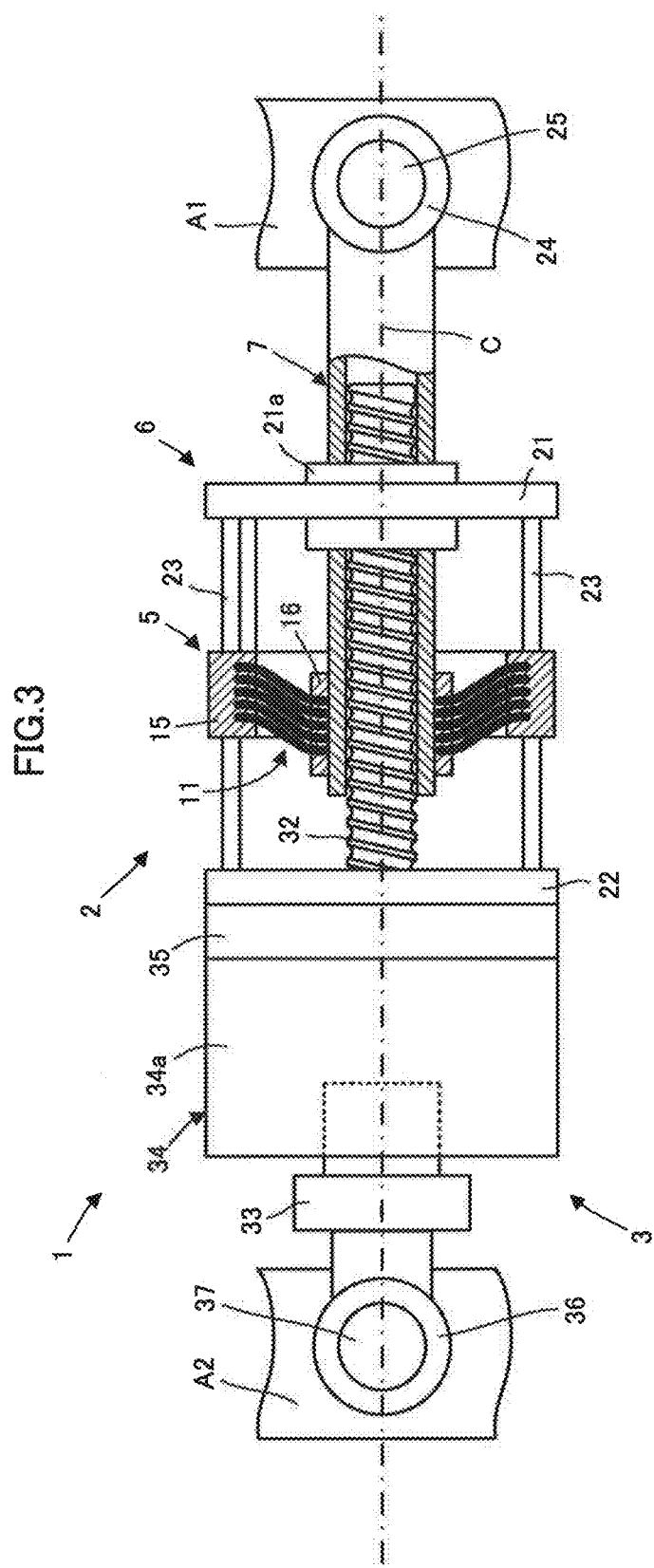
FIG. 3 is a view showing a state in which a transducer (electrostrictive element) of the linear motion displacement mechanism of the embodiment is elastically deformed.

When the external force in a direction in which the distance (distance on the central axis line C) between the first member A1 and the second member A2 decreases acts on the first member A1 in the state illustrated in FIG. 2, for instance, the elastic deformation part 11 of the electrostrictive element 5 is elastically bent as is illustrated in FIG. 3. Thereby, an elastic force results in being generated between the first member A1 and the second member A2.

In this case, if a voltage to be applied to the elastic deformation part 11 of the electrostrictive element 5 is varied, the elastic deformation part 11 extends or contracts in the direction along the face, and consequently the rigidity of the elastic deformation part 11 of the electrostrictive element 5 can also be varied.

In addition, the moving direction of the cylindrical member 7 which is fixed to the supporting frame 16 on the inner peripheral side of the electrostrictive element 5 is determined to be the direction coaxial with the central axis line C of the electrostrictive element 5, by the guide part 21a of the first plate 21 through which the cylindrical member 7 penetrates and the screw shaft 32 (linearly moving shaft) which is inserted in the cylindrical member 7 as the rod member.

Because of this, when the elastic deformation part 11 of the electrostrictive element 5 elastically deforms, the relative displacement direction of the supporting frame 16 on the inner peripheral side of the electrostrictive element 5 with respect to the supporting frame 15 on the outer peripheral side thereof is determined to be the direction of the central axis line C of the electrostrictive element 5. As a result, any of the elastic deformation parts 11 of the electrostrictive element 5 elastically deforms into a shape having high symmetry (such shape as to become axially symmetric with respect to the central axis line C).

Accordingly, in the vicinity of the central part of any one of the elastic deformation parts 11, excessively local stress concentration is prevented from occurring, and a damage such as a crack of the elastic deformation part 11 is prevented from occurring.

In addition, in the cylindrical member 7 which is connected to the central part of the elastic deformation part 11 of the electrostrictive element 5, the portion which projects from the first plate 21 of the base frame 6 to the side opposite to the second plate 22 moves in the direction of the central axis line C in the outside of the first plate 21 (side opposite to the second plate 22), concurrently with the bending of the elastic deformation part 11 of the electrostrictive element 5. On the other hand, the portion of the cylindrical member 7 on the side closer to the second plate 22 than to the first plate 21 moves in the direction of the central axis line C within the space between the first plate 21 and the second plate 22, concurrently with the bending of the elastic deformation part 11 of the electrostrictive element 5.

Because of this, the length of the spring mechanism 2 in the direction of the central axis line C of the electrostrictive element 5 (shaft center direction of the cylindrical member 7) can be comparatively short, and the spring mechanism 2 can be structured into a small size.

In addition, the cylindrical member 7 and the screw shaft 32 working as the linearly moving shaft of the actuator 3 are coaxially arranged, and accordingly the width of the linear motion displacement mechanism 1 in the direction perpendicular to the central axis line C of the electrostrictive element 5 can be made small. As a result, a small-sized linear motion displacement mechanism 1 can be achieved.

Incidentally, it goes without saying that the spring mechanism and the linear motion displacement mechanism of the present invention are not limited to those in the above described embodiment. Some modified embodiments of the above described embodiment will be described below.

In the above described embodiment, the rod member which is inserted in the cylindrical member 7 is configured of the screw shaft 32 working as the linearly moving shaft of the actuator 3. However, it is also acceptable that the screw shaft 32 (linearly moving shaft) and the rod member are separately configured, and the screw shaft 32 (linearly moving shaft) and the rod member are connected to each other through an appropriate connecting member. In this case, each of the shaft centers of the screw shaft 32 (linearly moving shaft) and the cylindrical member 7 may have a space in a direction perpendicular to the shaft center (each shaft center may be different from one another).

In addition, in the above described embodiment, the screw shaft 32 working as the rod member and the cylindrical member 7 have been coaxially arranged on the central axis line C of the elastic deformation part 11 of the electrostrictive element 5. However, it is also acceptable to prepare a plurality of sets of a cylindrical member 41 which is connected with the elastic deformation part 11 of the electrostrictive element 5, and a rod member 42 which is inserted in the cylindrical member 41, and arrange the plurality of sets of the cylindrical member 41 and the rod member 42 at an equiangular distance along a circumference of a circle which has a fixed radius from the central axis line C of the elastic deformation part 11, for instance, as is illustrated in FIG. 5A or FIG. 5B.

Also in the case where the members are structured in the above way, the elastic deformation part 11 can be elastically deformed into a shape having high symmetry (such shape as to become axially symmetric with respect to the central axis line C).

Figure 5A:
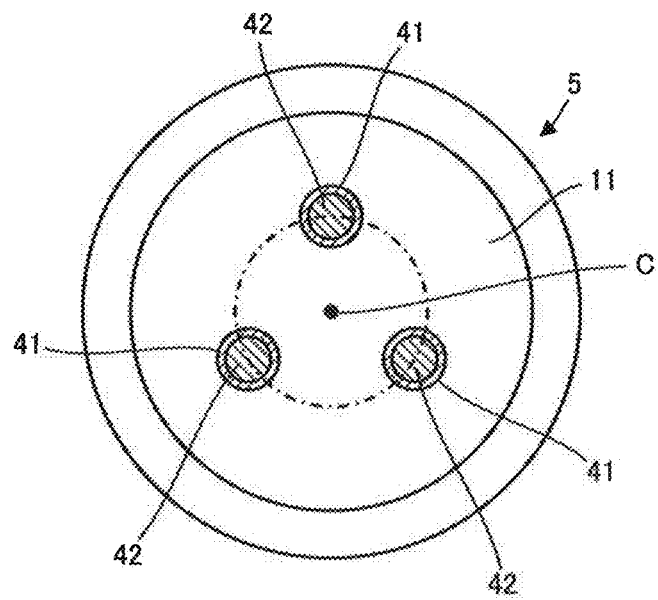
FIG. 5A and FIG. 5B are views showing arrangement examples of cylindrical members and rod members according to a modified embodiment.
Figure 5B:
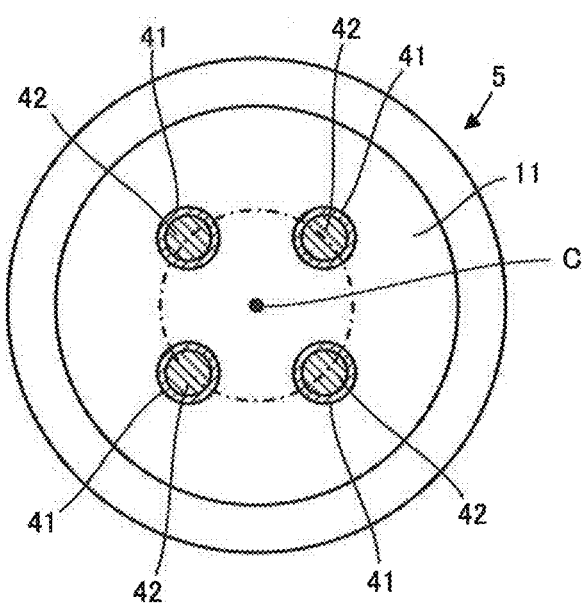

Incidentally, in FIG. 5A and FIG. 5B, the numbers of sets of the cylindrical member 41 and the rod member 42 which are provided in the spring mechanism are 3 sets and 4 sets, respectively, but more sets of the cylindrical member 41 and the rod member 42 may be provided in the spring mechanism.

In addition, in the above described embodiment, the actuator 3 is formed so as to have the ball screw mechanism 31. However, the actuator 3 may be configured of, for instance, a hydraulic cylinder which has a piston rod as the linearly moving shaft, or the like.

In addition, in the above described embodiment, the motor 34 is arranged on the axial center of the screw shaft 32 of the ball screw mechanism 31. However, it is also acceptable that the motor 34 is arranged, for instance, in the side part of the screw shaft 32, and that the motor 34 gives a rotational driving force to the nut 33 of the ball screw mechanism 31 through an appropriate power transmission mechanism (pulley, gear or the like).

In addition, in the above described embodiment, the electrostrictive element 5 is configured so as to have a plurality of stacked elastic deformation parts 11. However, the electrostrictive element 5 may have a single elastic deformation part 11.

In addition, in the above described embodiment, the transducer is configured of the electrostrictive element 5. However, the transducer in the present invention is not limited to the electrostrictive element. The transducer in the present invention may be a transducer which causes elastic deformation (extension and contraction in the direction along the face) of the elastic deformation part, while using energy other than electrical energy, such as magnetic energy and thermal energy, as input energy.

In addition, the spring mechanism of the present invention is not only applied to the linear motion displacement mechanism, but also can be applied to various apparatuses.

REFERENCE SIGNS LIST

1 . . . Linear motion displacement mechanism, 2 . . . Spring mechanism, 3 . . . Actuator, 5 . . . Electrostrictive element (transducer), 7 . . . Cylindrical member, 11 . . . Elastic deformation part, 23 . . . Connecting rod (Supporting member), 21 . . . First plate (first element member), 22 . . . Second plate (second element member), 31 . . . Ball screw mechanism, 32 . . . Screw shaft (linearly moving shaft, rod member), 33 . . . Nut, 34 . . . Motor, C . . . Central axis line.

What is claimed is:

1. A spring mechanism comprising:
a transducer that has an elastic deformation part with a film shape, which is structured so as to be able to elastically extend and contract in a direction along a face, depending on input energy; and
a supporting member which supports an edge part of the elastic deformation part of the transducer, wherein
the spring mechanism further comprises:
a first element member and a second element member which are arranged on both sides in a direction of a central axis line of the elastic deformation part of the transducer, so as to face to the elastic deformation part at a distance from the elastic deformation part, respectively, and are also fixed to the supporting member, respectively;
a cylindrical member that is provided so as to extend toward the first element member from the elastic deformation part of the transducer in the same direction as the central axis line of the elastic deformation part of the transducer, also is arranged so as to slidably penetrate the first element member, and is formed into a hollow cylindrical shape in which one end part on the elastic deformation part side of the transducer is opened; and
a rod member which is provided so as to extend toward the cylindrical member from the second element member side coaxially with the cylindrical member, and is slidably inserted in the cylindrical member, and
one set of the cylindrical member and the rod member is arranged on the central axis line of the elastic deformation part of the transducer, or a plurality of sets of the cylindrical member and the rod member are arranged so as to align at an equiangular distance along a circumference of a circle around the central axis line of the elastic deformation part of the transducer, which has a fixed radius from the central axis line.

2. The spring mechanism according to claim 1, wherein the one set of the cylindrical member and the rod member is arranged on the central axis line of the elastic deformation part of the transducer.

3. The spring mechanism according to claim 1, wherein the transducer is a transducer that has a plurality of elastic deformation parts which are stacked in a thickness direction.

4. A linear motion displacement mechanism which carries out relative displacement between a first member and a second member, comprising:
   the spring mechanism according to claim 1; and
   an actuator that has a linearly moving shaft which is provided integrally with the rod member and movably in the same direction as a central axis line of the elastic deformation part, and generates a driving force of displacing the linearly moving shaft in a shaft center direction thereof, wherein
   the first member is connected to a portion of the cylindrical member of the spring mechanism, which extends from the first element member to an opposite side of the transducer, and the rod member is connected to the second member via the linearly moving shaft.

5. The linear motion displacement mechanism according to claim 4, wherein
   the actuator is an actuator comprising:
   a ball screw mechanism that has a screw shaft working as the linearly moving shaft, and a nut which fits around the screw shaft via balls; and
   a motor which rotationally drives the nut of the ball screw mechanism.

6. The linear motion displacement mechanism according to claim 4, wherein
   the rod member and the linearly moving shaft are coaxially and integrally configured.

\* \* \* \* \*